United States Patent [19]
Bair

[11] 4,221,461
[45] Sep. 9, 1980

[54] FIBER CONNECTOR GAP MATERIAL

[75] Inventor: Harvey E. Bair, Chester, N.J.

[73] Assignee: Bell Telephone Laboratories, Incorporated, Murray Hill, N.J.

[21] Appl. No.: 39,851

[22] Filed: May 17, 1979

[51] Int. Cl.³ .............................................. G02B 5/14
[52] U.S. Cl. .................................. 350/96.20; 264/1; 350/96.15; 350/96.17; 350/96.21
[58] Field of Search ............... 350/96.15, 96.17, 96.20, 350/96.21, 96.22; 264/1; 425/808

[56] References Cited

U.S. PATENT DOCUMENTS

| | | | |
|---|---|---|---|
| 3,455,625 | 7/1969 | Brumley et al. | 350/96.22 |
| 3,829,195 | 8/1974 | Rawson | 350/96.18 |
| 3,864,019 | 2/1975 | Smolinsky et al. | 350/96.17 |
| 3,910,678 | 12/1975 | McCartney | 350/96.21 |
| 3,995,935 | 12/1976 | McCartney | 350/96.21 |
| 4,102,559 | 7/1978 | Hunzinger | 350/96.18 |
| 4,107,242 | 8/1978 | Runge | 350/96.21 |
| 4,119,362 | 10/1978 | Holzman | 350/96.21 |
| 4,123,138 | 10/1978 | Morrison | 350/96.21 |

OTHER PUBLICATIONS

C. Kleekamp et al., "Designer's Guide to Fiber Optics—Part 4," *EDN Magazine,* Boston, Mass., 1978, pp. 1–12.

Timmermann, "Highly Efficient Light Coupling from GaAlAs Lasers Into Optical Fibers," *Applied Optics,* vol. 15, No. 10, Oct. 1976, pp. 2432–2433.

R. M. Carvey et al., "Thermoplastic Polyurethane Materials for Adhesive Systems," *Adhesives Age,* Sep. 1968, pp. 1–3.

"Estane Polyurethanes," Advertising Brochure from B. F. Goodrich Chem. Div.

*Primary Examiner*—Stewart J. Levy
*Attorney, Agent, or Firm*—Peter V. D. Wilde

[57] ABSTRACT

Optical fiber end coating materials are shown along with a method of applying them. The materials are thermoplastic polyurethanes, which are cast onto the end of a fiber by dissolving the material in a solvent, applying the solution to the fiber end, and heating to remove the solvent. Optical devices are prepared in a similar manner. A polyurethane button results that elastically deforms under pressure, bridging the gap between fibers, or between a fiber and an optical device. This reduces reflections from air gaps when used with a compression type connector.

27 Claims, 2 Drawing Figures

FIBER CONNECTOR GAP MATERIAL

BACKGROUND OF THE INVENTION

1. Field of the Invention

This invention relates to materials and procedures for making low loss connections to optical fibers and optical devices. More particularly, this invention covers the use of thermoplastic polyurethane materials for bridging the gap between the end of one fiber and another fiber, or between a fiber and a device.

2. Description of the Prior Art

The prior optical fiber art teaches various procedures for obtaining low loss connections between lengths of fibers, both between lengths of single fibers and lengths of multiple fiber bundles. One way of doing this is simply to press the ends of the fibers together by means of a connector, for which various designs are known in the art. The ends of the fibers may be first prepared by polishing, or breaking, or slicing, to obtain a more uniform defect-free surface that results in lower loss.

Other means of reducing connection loss are lenses attached to the ends of the fibers, or index matching fluid that fills the gap between the ends of the fibers. This latter technique has the advantage in some cases of reducing the need for preparing the end surface by polishing, or slicing, as the fluid tends to conform to the shape of the end of the fiber. However, fluids such as glycerol tend to trap foreign matter in the gap, particularly while the fibers are being connected, which may increase losses. Furthermore, such fluids are not very suitable when multiple connect/disconnect operations are required.

One technique that avoids many of the problems of index matching fluids is the use of a transparent flexible index matching dome of a material that adheres to the ends of the connectors and bridges the gap between the ends of the fibers; see U.S. Pat. No. 4,107,242, which suggests such materials as silicone rubber. However, improvements in coupling loss and durability of the material bridging the gap are highly desirable.

For connecting an optical fiber cable to an optical device, such as a light emitting diode (LED) or laser source, or a photodiode or phototransistor detector, the prior art generally uses permanent bonding techniques. These typically include the use of epoxy type cements or other thermosetting compounds. It would be desirable in certain circumstances to be able to rapidly connect and disconnect an optical fiber to such an optical device.

SUMMARY OF THE INVENTION

I have discovered the use of transparent thermoplastic polyurethane materials for coating the end of an optical fiber or the active area of an optical device to reduce coupling loss between fiber lengths, or between a fiber and an optical device. Such material adhere to the end of a fiber or to a device and deform elastically when pressed upon making connection to the end of another optical fiber or optical device. Connection is made by means of a compression connector, which presses two fiber ends together, or presses a fiber end and a device together.

The materials described have an index of refraction close to that of the optical fiber, reducing reflection losses due to air gaps between uncoated fibers. For connecting one optical fiber to another optical fiber, such a deformable coating is preferentially applied to both fiber ends being joined. However, sufficient flexibility and conformation is obtained in many cases to allow the use of such material on only one fiber end, with the other end remaining uncoated. For connecting an optical fiber to an optical device, either the optical fiber, or the device, or both may be coated. Either case allows fibers to be connected and disconnected numerous times without a significant increase in coupling loss.

The presently preferred thermoplastic polyurethane materials are of the type trademarked "Estane" by the B. F. Goodrich Company. These are generally classified as the high molecular weight reaction products of hydroxy terminated polyesters or polyethers and diisocyanates. The presently preferred method of applying these materials is by dissolving them in a solvent, applying the solution to the end of the fiber or the active area of the device, and heating the material until the solvent is removed.

Figure 1:
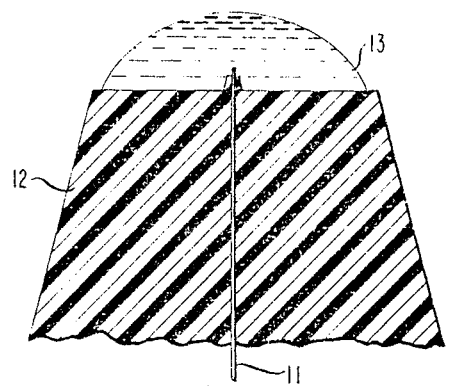
FIG. 1 shows a typical fiber connector end coated with thermoplastic material in solution.

No inference should be drawn as to actual coating thickness from these drawings.

DETAILED DESCRIPTION

The following description covers materials and techniques for coating the ends of optical fibers or the active areas of optical devices with a flexible transparent material that fills the gaps between fibers or between a fiber and an optical device when connection is made. As used herein, the term "optical fiber" means those fibers that provide a propagation path for electromagnetic energy in the visible, infrared, or ultraviolet regions of the spectrum. Glass and plastic are the most typical fiber materials. Unless otherwise denoted, both single optical fiber cables and multiple fiber cables are included in the term "optical fiber". The term "optical device" includes sources, detectors, mixers, filters, and other devices operating in the visible, infrared, or ultraviolet regions of the electromagnetic spectrum, and the term "light" includes visible, infrared, and ultraviolet light. The term "active area of a device" means the light emitting or light receptive portion of an optical device. The term "thermoplastic" means those plastic materials that soften when heated and thus do not become permanently set in a rigid shape when heated. The term "elastically deformable" means that the material will return to substantially its original shape after compression at some pressue less than a certain maximum pressure. The term "compression connector" means any connector that applies a force along the longitudinal axis of an optical fiber so as to force the end of one fiber against the end of another fiber, or against an optical device.

The materials used for practicing the present invention are transparent polyurethane thermoplastic which are dissolved in a solvent prior to application to the end of a fiber or to the active area of a device. The solvent is then removed by heating, which process is referred to herein as "casting". The resulting material cast on the end of the fiber or on a device is referred to herein as a polyurethane button (PUB). It has been discovered that the polyurethane materials described herein have the requisite desirable properties for obtaining low loss connections capable of withstanding multiple connect- /disconnect operation when applied according to the principles of the present invention. Both polyester and polyether urethane materials have been investigated. In particular, the family of polyurethanes trademarked Estane by the B. F. Goodrich Company have been found suitable.

One of the requirements for a suitable material is that it adhere strongly to the fiber or device. This is necessary to insure that multiple connect/disconnect operations will not cause the material to loosen from the fiber or device. Any loosening could introduce air gaps that would increase optical loss and could even cause the button to fall off entirely. Furthermore, a strong adherence prevents loosening if the button is cleaned, as by wiping with a cloth. Secondly, the material should be mar-resistant to allow multiple connect/disconnect operations without damaging the button, and to allow cleaning the button by wiping with a cloth without damage. Thirdly, the material should have an index of refraction which is close to that of the optical fiber being connected. Generally, materials with an index of refraction in the range of 1.30 to 1.70 are suitable for use with glass or plastic fibers.

Fourthly, the material should be sufficiently elastically deformable so that when compressed, air gaps are eliminated. This reduces reflection losses that otherwise occur if air gaps are present between the ends of the fibers, or between a fiber and a device. In particular, after casting on the end of a fiber installed in a connector the button may be in the form shown in FIG. 2 wherein the coating is thicker near the edges than in the center. The material should have enough elastic deformability so that when pressed against the end of another fiber or a device, including one coated in a like manner, the material will compress enough to fill the space between the fiber ends or between the fiber and the device, eliminating a possible air gap. However, to prevent the material from permanently deforming, which would prevent low loss coupling after multiple connect/disconnect operations, the material should not be compressed beyond its elastic limit.

The materials and methods shown herein have the additional advantage that the polyurethane is applied in a solution of sufficiently low viscosity that the material essentially conforms to the shape of the fiber end, filling small irregularities in the end surface of the fiber. It has been found that in some cases this allows the elimination of a time-consuming polishing step that formerly was necessary to obtain low loss connections. Thus, many of the advantages of an index matching fluid are obtained while allowing for multiple connect/disconnect operation. Further, the ability to easily clean the coated end of the fiber by simply wiping with a lint-free cloth is obtained while eliminating the index matching fluid, which tends to trap dirt in the gap between the fibers and can be messy to clean. The PUB coating on the fiber also tends to protect the fiber end from damage.

The method of applying the PUB is a casting method wherein the polyurethane material is initially dissolved in a solvent and applied to the end of a fiber or to a device. The method described herein is similar to those known in the art for applying Estane material. In FIG. 1 is shown a single optical fiber 11 inserted in a typical connector 12 coated with the polyurethane in solution 13. The connector shown is typical; however, other types are possible, including multiple fiber types, and those in which the fiber or fibers are flush with, or recessed in, the end of the connector. The details of the connector design are not included in the present invention except that the connector should be a compression connector as defined above.

The material in solution is then heated, which removes the solvent without causing a significant amount of cross-linking of the polyurethane material. This casting method is to be distinguished from curing, which is typical for epoxy type materials and thermosetting materials generally, wherein heating the material produces cross-linking of the polymer. By casting the material, the thermoplastic property of the polyurethane is maintained, allowing the button to elastically deform and eliminate air gaps between fibers upon compression. The solvents given herein are among numerous commercial solvents known in the art to be useful with Estane material. The temperature at which the material is cast should be high enough to prevent crystallization of the polyurethane, which occurs if the material is cast too slowly, as when the casting temperature is too low. On the other hand, the temperature should be low enough to prevent degradation of the polymer, as by chain scission. Generally, temperatures between 70 and 150 degrees C. are suitable for the materials described herein, with 110 degrees C. being typical.

The Estane type of thermoplastic polyurethanes are the high molecular weight reaction products of a hydroxy terminated polyester or polyether and a diisocyanate. The term "high molecular weight" generally means a molecular weight greater than 10,000. The diisocyanate used in the Estane family is 4,4'methylene bis phenyl isocyanate (MDI), which has the structure:

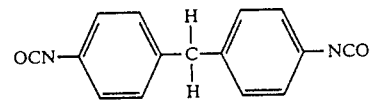

This aromatic diisocyante may be chain extended by reacting with polyhydroxy-bearing materials, such as 1,4-butanediol. Other diisocyanates and chain extenders are possible for producing suitable PUB material.

The Estane type polyurethane is composed of alternating blocks of hard (MDI based) segments and soft (polyether or polyester) sequences. The general chemical structure of this polyurethane can be represented in the form:

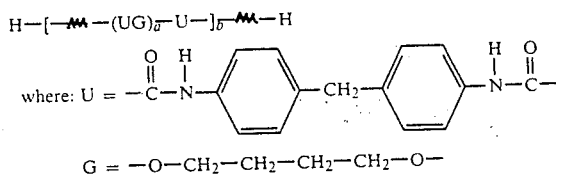

$G = -O-CH_2-CH_2-CH_2-CH_2-O-$

∿∿ = polyether: $-O-[(CH_2)_{\overline{x}}-O-]_m$ or

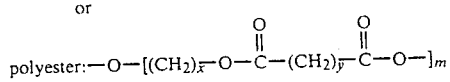

Two parameters (a and b) characterize the polyurethane chain. First, b relates to the overall polymer molecular weight, and has a value of at least 10. The second, a, represents the average size of the hard blocks, and has values ranging from 0.10 to 2.0. The block length of the polyester or polyether is controlled by the value of m. The value of m ranges from about 5 for the polyester to about 14 for the polyether. The number of CH$_2$ units in the polyester or polyether are represented by x and y, and range from 2 to 8. The weight percentage of MDI in the Estane type polyurethanes is in the range from 30 to 40 percent.

The Estane family meets the requirements listed above. In particular, they generally have a relatively hard surface, being 70A or greater on the ASTM D 2240 scale. This results in good mar resistance, while the Estanes retain the ability to elastically deform under compression. The compressive strength of the Estanes is at least 10,000 psi (69 MPa), and the tensile strength is at least 24 MPa, by the ASTM D 882 test, both of which tend to insure long life of the PUB with multiple connect/disconnect operations. Furthermore, the index of refraction is well within the 1.30 to 1.70 limit.

Further details of the materials and methods included herein will be shown by the following example.

EXAMPLE

Figure 2:
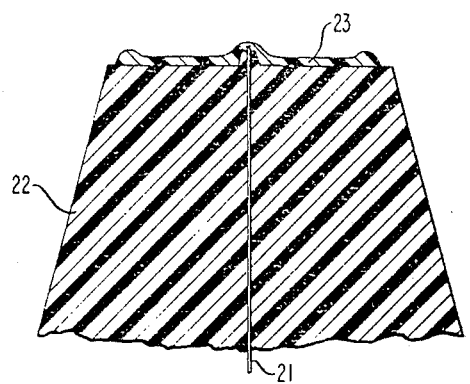
FIG. 2 shows a typical contour of the material after the solvent is removed.

This Example shows a typical application of a PUB to each of two fibers to be connected by means of a pressure connector; see FIGS. 1 and 2.

The coating solution was prepared by dissolving about 15 weight percent of a B. F. Goodrich thermoplastic polyurethane, Estane 5707 into a solution containing equal amounts by weight of methyl ethyl ketone (MEK) and n,n-dimethyl formamide. Before the polyurethane pellets were solvated they were rinsed in acetone and then MEK to remove a surface lubricant. Solution of the polyurethane was accomplished by stirring the mixture at 65 degrees C. for several hours. The solvated thermoplastic polyurethane was applied to the tip of the optic fiber inside a small epoxy cone which protrudes about 200 μm from the center of the end face of the fiber plug. The drop volume was approximately 4 microliters, and the drop was sufficient in size to cover about 70 percent of fiber plug's end surface which is about 4.4 mm in diameter. With the drop atop the fiber plug, it was placed in an air oven and maintained in a vertical position for 10 minutes at 110 degrees C. in order to volatize the solvents from the coating solution and prevent crystallization of the resulting film. Under these conditions the PUB is about 30 μm thick near its center, and about twice this thick near its outer edge. Films produced in this manner have a glass temperature of −20 degrees C., and have been stored at 24 degrees C. for 20 months with no sign of crystallization. The use of a PUB prepared in this manner reduced the loss through a fiber connector having a 30 micron gap from about 0.8 dB without the PUB to about 0.5 dB with the PUB to light having a wavelength of 0.82 microns, thus yielding an improvement in optical loss of about 0.3 dB. It is expected that other connector designs will yield different amounts of improvement.

The Estane 5707 listed above is the presently preferred member of the Estane family in that it has a relatively hard surface, being 95A on the ASTN D 2240 scale, which results in good mar resistance. This is combined with high compressive strength and high tensile strength, to yield the most durable PUB material investigated thus far. Other members of the Estane family, including 5715, 5701, 5714, and 5710, have also been prepared in a comparable manner to that given in the example above, with useful results. Estane 5714 is a polyether type polyurethane, with the others listed being polyester type polyurethanes. It is generally known in the chemical art that polyethers resist hydrolysis better than polyester polyurethanes. This makes 5714 more suitable for environments having a high water content.

The maximum compressive load that each member of the Estane family can withstand before undergoing inelastic deformation will depend upon the particular properties of that member of the family. Excessive inelastic deformation will lead to an increase in coupling loss. In particular, Estane 5707 formed into a button of the size given in the above example can withstand a force of 4 lbs. without excessive deformation for over one hundred connect/disconnect operations. To prevent the button from deforming beyond its elastic limit for a given compressed thickness, the thickness of the button in the uncompressed state should be less than a certain amount. On the other hand, the button thickness should be greater than a certain amount to provide enough material to flexibly fill any air gaps between the fiber ends. For an Estane 5707 button of the size given in the above Example, for a compressive force of 4 lbs., the uncompressed button should be between 10 and 50 microns thick.

In addition to the above materials and procedures, various additional modifications and extensions of this invention will become apparent to those skilled in the art. For example, numerous other reaction products of hydroxy terminated polyesters or polyethers and diisocyanates are possible. Other configurations for the coating are also possible, including dome-shaped buttons or concave-shaped buttons, in addition to the button shown above. Numerous other commercial solvents and heating techniques may be used to cast the button on the end of the fiber. As noted above, a PUB can also be used for connecting a fiberoptic length to an optical device such as an LED or laser light source or a photodiode detector, etc. In this case a layer of another material may be included to match the generally higher indices of refraction of most solid state optical devices. The fiber would then be held against the device by means of a pressure connector as defined above. The end of a fiber may also be prepared by various prior art techniques, as by attaching a lens thereto, either before or after the application of the PUB. All such variations and deviations which basically rely on the teachings through which this invention has advanced the art are properly considered to be within the spirit and scope of this invention.

I claim:

1. An optical fiber having a transparent material adhering to an end of said fiber, for use with a compression connector, THE INVENTION CHARACTERIZED in that said material is a thermoplastic polyurethane having an index of refraction in the range of 1.30 to 1.70, and having a hardness of at least 70A on the ASTM D 2240 scale, and having a compressive strength of at least 69 MPa, and having a tensile strength of at least 24 MPa by the ASTM D 882 test.

2. An optical device having a transparent material adhering to the active area of said device, for use with a compression connector, THE INVENTION CHARACTERIZED in that said material is a thermoplastic polyurethane having an index of refraction in the range of 1.30 to 1.70, and having a hardness of at least 70 A on the ASTM D 2240 scale, and having a compressive strength of at least 69 MPa, and having a tensile strength of at least 24 MPa by the ASTM D 882 test.

3. The invention of claims 1 or 2 FURTHER CHARACTERIZED in that said material is a polyester type polyurethane.

4. The invention of claim 3 FURTHER CHARACTERIZED in that said material is a high molecular weight reaction product of a hydroxy terminated polyester and a diisocyanate.

5. The invention of claim 4 FURTHER CHARACTERIZED in that said diisocyanate is 4,4'methylene bis phenyl isocyanate.

6. The invention of claim 5 FURTHER CHARACTERIZED in that said diisocyanate forms from 30 to 40 percent by weight of said polyurethane.

7. The invention of claim 6 FURTHER CHARACTERIZED in that said diisocyanate is chain extended by 1,4-butanediol.

8. The invention of claims 1 or 2 FURTHER CHARACTERIZED in that said material is a polyether type polyurethane.

9. The invention of claim 8 FURTHER CHARACTERIZED in that said material is a high molecular weight reaction product of a hydroxy terminated polyether and a diisocyanate.

10. The invention of claim 9 FURTHER CHARACTERIZED in that said diisocyanate is 4,4'methylene bis phenyl isocyanate.

11. The invention of claim 10 FURTHER CHARACTERIZED in that said diisocyanate forms from 30 to 40 percent by weight of said polyurethane.

12. The invention of claim 11 FURTHER CHARACTERIZED in that said diisocyanate is chain extended by 1,4-butanediol.

13. A method of preparing an optical fiber for use with a compression connector by steps comprising applying a transparent material to an end of said fiber, THE INVENTION CHARACTERIZED in that said material is a thermoplastic polyurethane having an index of refraction in the range of 1.30 to 1.70, and having a hardness of at least 70 A on the ASTM D 2240 scale, and having a compressive strength of at least 69 MPa, and having a tensile strength of at least 24 MPa by the ASTM D 882 test, and further characterized in that said material is initially dissolved in a solvent which is removed by heating after application to said fiber.

14. A method of preparing an optical device for use with a compression connector by steps comprising applying a transparent material to the active area of said device,
THE INVENTION CHARACTERIZED in that said material is a thermoplastic polyurethane having an index of refraction in the range of 1.30 to 1.70, and having a hardness of at least 70 A on the ASTM D 2240 scale, and having a compressive strength of at least 69 MPa, and having a tensile strength of at least 24 MPa by the ASTM D 882 test, and further characterized in that said material is initially dissolved in a solvent which is removed by heating after application to said device.

15. The method of claims 13 or 14 FURTHER CHARACTERIZED in that said material is a polyester type polyurethane.

16. The method of claim 15 FURTHER CHARACTERIZED in that said material is formed as a high molecular weight reaction product of a hydroxy terminated polyester and a diisocyanate.

17. The method of claim 16 FURTHER CHARACTERIZED in that said diisocyanate is 4,4'methylene bis phenyl isocyanate.

18. The invention of claim 17 FURTHER CHARACTERIZED in that said diisocyanate forms from 30 to 40 percent by weight of said polyurethane.

19. The invention of claim 18 FURTHER CHARACTERIZED in that said diisocyanate is chain extended by 1,4-butanediol.

20. The method of claims 13 or 14 FURTHER CHARACTERIZED in that said material is a polyether type polyurethane.

21. The method of claim 20 FURTHER CHARACTERIZED in that said material is formed as a high molecular weight reaction product of a hydroxy terminated polyether and a diisocyanate.

22. The method of claim 21 FURTHER CHARACTERIZED in that said diisocyanate is 4,4'methylene bis phenyl isocyanate.

23. The method of claim 22 FURTHER CHARACTERIZED in that said diisocyanate forms from 30 to 40 percent by weight of said polyurethane.

24. The method of claim 23 FURTHER CHARACTERIZED in that said diisocyanate is chain extended by 1,4-butanediol.

25. The method of claims 13 or 14 FURTHER CHARACTERIZED in that said solvent is a mixture of methyl ethyl ketone and n,n-dimethyl formamide, and still further characterized in that said heating is accomplished by elevating the temperature of said material as dissolved in said solvent to between 70 and 150 degrees C. until said solvent is removed.

26. An optical fiber prepared according to the method of claim 13.

27. An optical device prepared according to the method of claim 14.

* * * * *